United States Patent [19]

Scaramucci

[11] Patent Number: 4,809,739
[45] Date of Patent: Mar. 7, 1989

[54] CHECK VALVE

[76] Inventor: John P. Scaramucci, 10724 Woodridden, Oklahoma City, Okla. 73170

[21] Appl. No.: 168,506

[22] Filed: Mar. 15, 1988

Related U.S. Application Data

[63] Continuation of Ser. No. 23,786, Mar. 9, 1987, abandoned.

[51] Int. Cl.[4] .............................................. F16K 15/03
[52] U.S. Cl. .................. 137/515.7; 137/527.4; 137/527.8; 251/364
[58] Field of Search ............... 137/515.7, 527.4, 527.8, 137/527; 251/364

[56] References Cited

U.S. PATENT DOCUMENTS

| | | |
|---|---|---|
| 85,571 | 1/1869 | Densmore . |
| 274,149 | 3/1883 | Stewart . |
| 286,676 | 10/1883 | Belnap . |
| 320,380 | 6/1885 | McDowell . |
| 611,074 | 9/1898 | Mowe . |
| 846,317 | 3/1907 | Kiddle ............................. 137/527.4 |
| 922,262 | 5/1909 | Clemens . |
| 941,713 | 11/1909 | Jacobs . |
| 996,099 | 6/1911 | Leidecker . |
| 2,048,088 | 7/1936 | Wagner . |
| 2,082,543 | 6/1937 | Hillman . |
| 2,282,532 | 5/1942 | Shenk ............................. 137/527.4 |
| 2,303,808 | 12/1942 | Wolcott . |
| 2,454,072 | 11/1948 | Long . |
| 2,729,238 | 1/1956 | Hite . |
| 3,491,796 | 1/1970 | Scaramucci . |
| 3,817,277 | 6/1974 | Wheatley . |
| 3,934,608 | 1/1976 | Guyton ............................. 137/527.8 |
| 4,128,111 | 12/1978 | Hansen . |
| 4,223,697 | 9/1980 | Pendleton ........................ 137/527.8 |
| 4,230,150 | 10/1980 | Scaramucci . |
| 4,252,144 | 2/1981 | Scaramucci . |
| 4,261,383 | 4/1981 | Prince . |
| 4,274,436 | 6/1981 | Smith ............................. 137/527 X |
| 4,286,534 | 5/1986 | McNeely ......................... 137/527.4 |

FOREIGN PATENT DOCUMENTS

| | | |
|---|---|---|
| 1162820 | 2/1984 | Canada . |
| 2079406 | 1/1982 | United Kingdom ............. 137/527.8 |

Primary Examiner—Robert G. Nilson
Attorney, Agent, or Firm—Dunlap, Codding & Peterson

[57] ABSTRACT

A swing check valve wherein the valve seat, disc and hanger for the disc are in the form of a replaceable cartridge which can be conveniently inserted in and removed from the valve chamber through one end of the valve body. The hanger is sized such that the hinge pin of the disc can move a limited distance in the hanger toward and away from the valve seat to provide a floating disc. A projection is formed on the disc positioned to engage the valve seat when the disc extends at about 90° from the seat. The seal ring in the valve seat is sized to completely fill its receiving groove and the face of the valve seat is recessed at one side of the groove for distortion of the material of the seal ring therein upon closure of the valve.

24 Claims, 5 Drawing Sheets

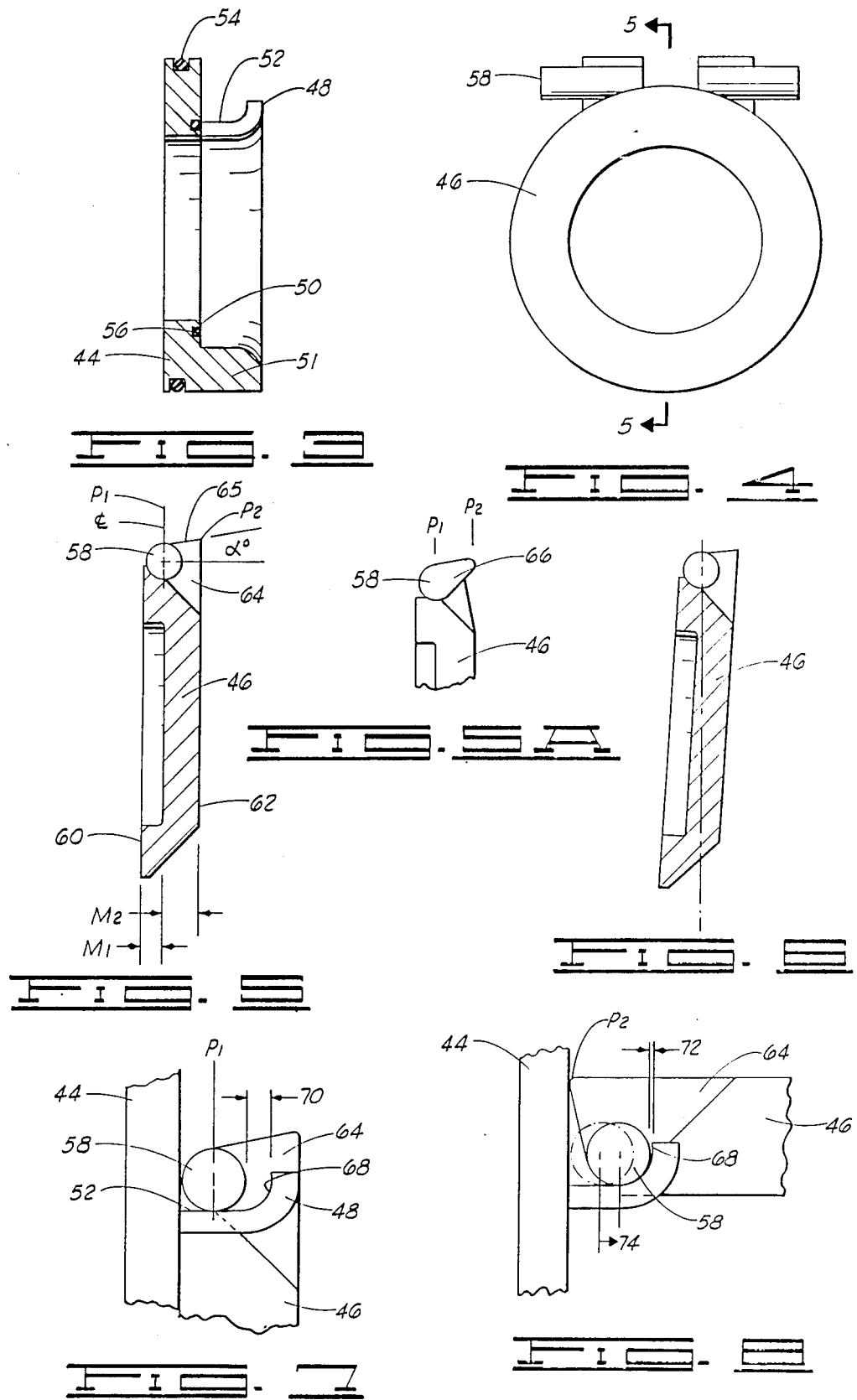

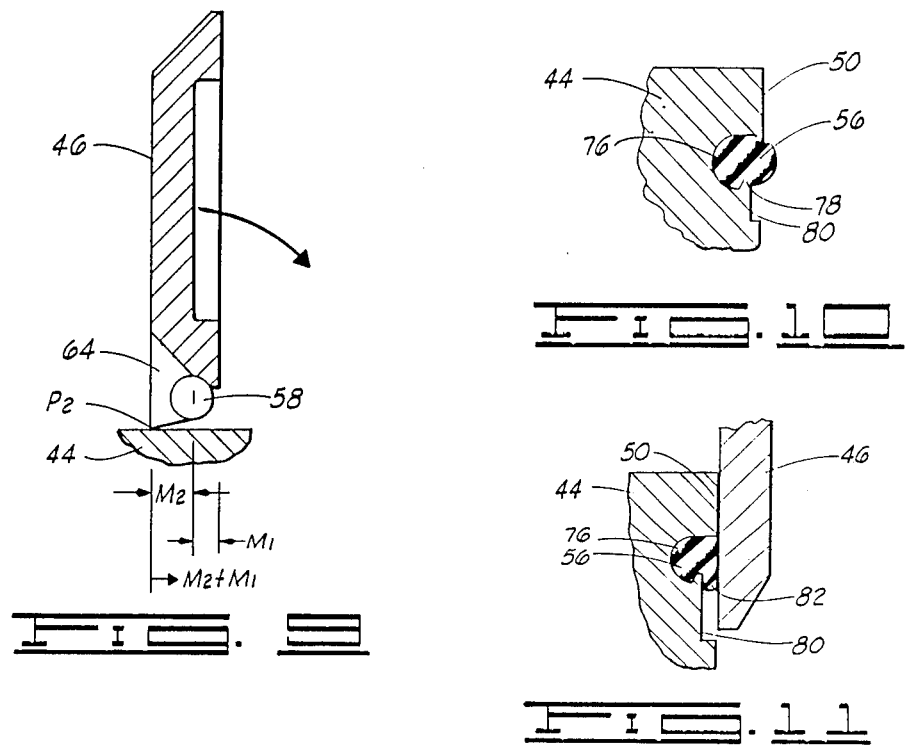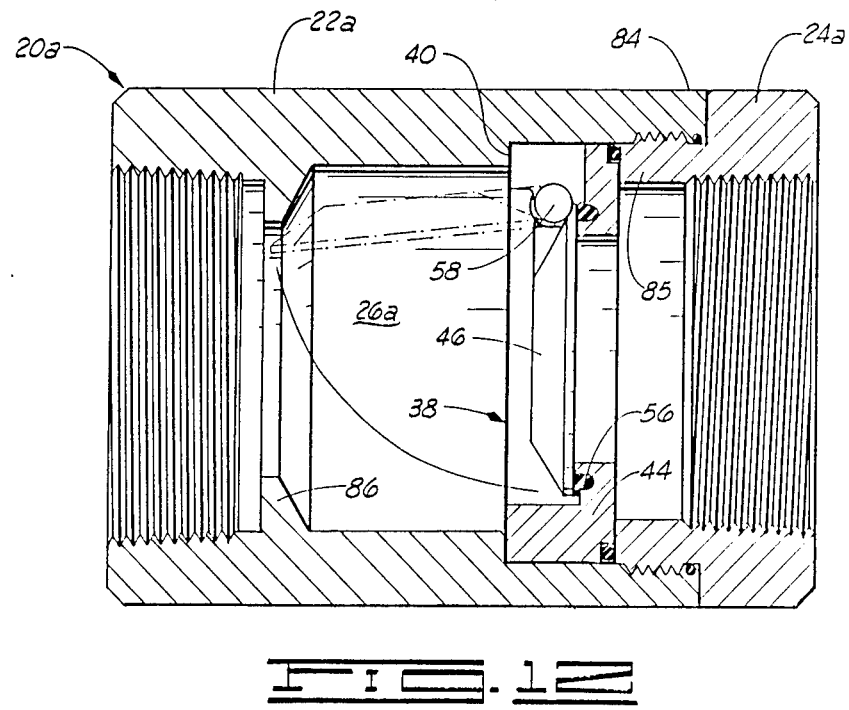

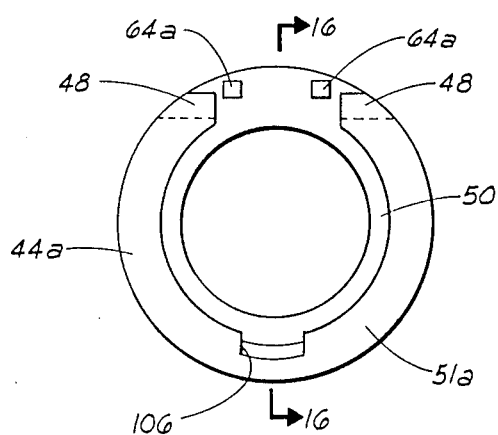
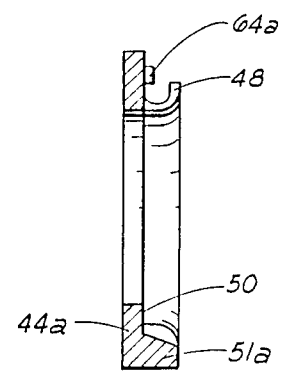
FIG. 15
FIG. 16
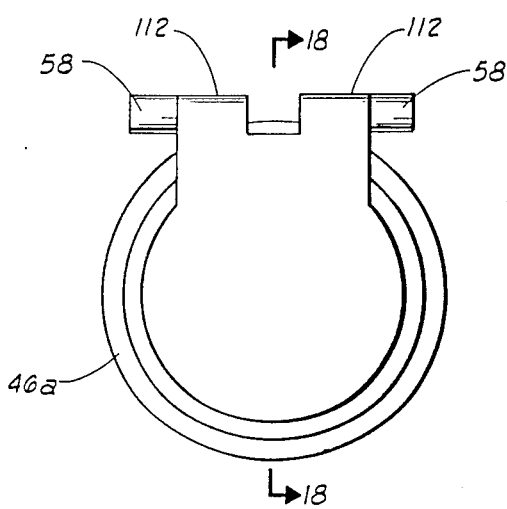
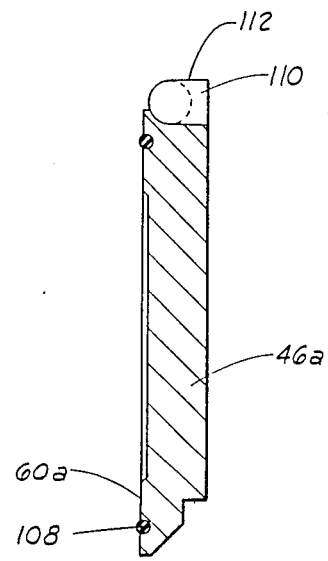
FIG. 17
FIG. 18

CHECK VALVE

This is a continuation of application Ser. No. 023,786 filed on Mar. 9, 1987 and now abandoned.

BACKGROUND OF THE INVENTION

1. Field of the Invention

This invention relates to improvements in check valves, and more particularly, a swing-type check valve.

2. Discussion of the Prior Art

Swing-type check valves have been known for many years and are widely used in many industrial processes for preventing the backflow of liquid through a conduit. Generally speaking, such valves have been difficult to repair, frequently requiring replacement of an entire valve body when only a portion of the structure, such as the valve seat, becomes worn through use.

In view of the fact that swing check valves are desirably designed such that the valve can be used either in a horizontally extending conduit or in a vertically extending conduit, heretofore, the valve body usually is designed such that the disc will open through an angle of less than 90°. The reason being that when such a valve is used in a vertical orientation, it is necessary that the disc swing from an open position to a closed position in the event of a condition of no-flow through the conduit in which the valve is installed. In other words, the valve disc should be oriented in such a way that it will close solely by gravity in the event of a no-flow condition.

It is important in the operation of swing check valves that the hinge pin for the disc extend at 90° to the axis of not only the disc, but also the seat, in order that the disc will seat evenly on the seat. In the past, valves have frequently not maintained such alignment, either through faulty assembly or wear of the hinge pin or its support. When such occurs, the disc does not become properly aligned on closure.

BRIEF DESCRIPTION OF THE DRAWINGS

FIG. 3 is a cross sectional view of the valve seat with the hanger thereon.

FIG. 4 is an end, elevational view of the valve disc of the valve shown in FIG. 2.

FIG. 5 is cross sectional view through the disc taken along lines 5—5 of FIG. 4.

FIG. 5A is a modification of the structure of the upper portion of the disc illustrated in FIG. 5.

FIG. 6 is a cross sectional view similar to FIG. 5 to illustrate what would be the free hanging position of the disc.

FIG. 7 is a schematic illustration of the hanger and the hinge pin of the disc whenthe disc is in a seated position on the valve seat.

FIG. 8 is a schematic view similar to FIG. 7 illustrating the movement of the hinge pin in the hanger when the valve disc is in an open position.

FIG. 9 is a cross sectional view through the valve disc illustrating the operation of the disc when the disc is employed in a vertically oriented valve.

FIG. 10 is an enlarged cross sectional view of the preferred seal of the valve seat in an undistorted configuration.

FIG. 11 is a view similar to FIG. 10 illustrating the distortion of the seal of the valve seat when the disc is closed.

FIG. 12 is a cross sectional view through a modified valve construction.

FIG. 15 is an elevational view of a modified valve seat.

FIG. 16 is a sectional view taken along lines 16—16 of FIG. 15.

FIG. 17 is an elevational view of a modified disc.

FIG. 18 is a sectional view taken along lines 18—18 of FIG. 17.

DETAILED DESCRIPTION OF THE DRAWINGS

Figure 1:
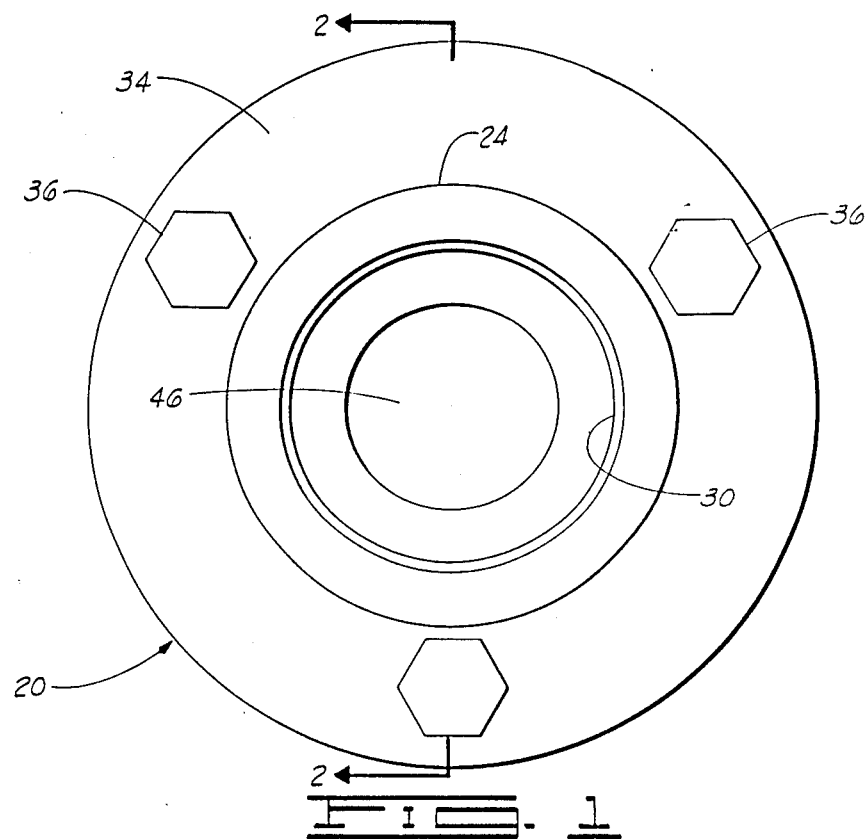
FIG. 1 is an end view of a valve constructed pursuant to this invention.
Figure 2:
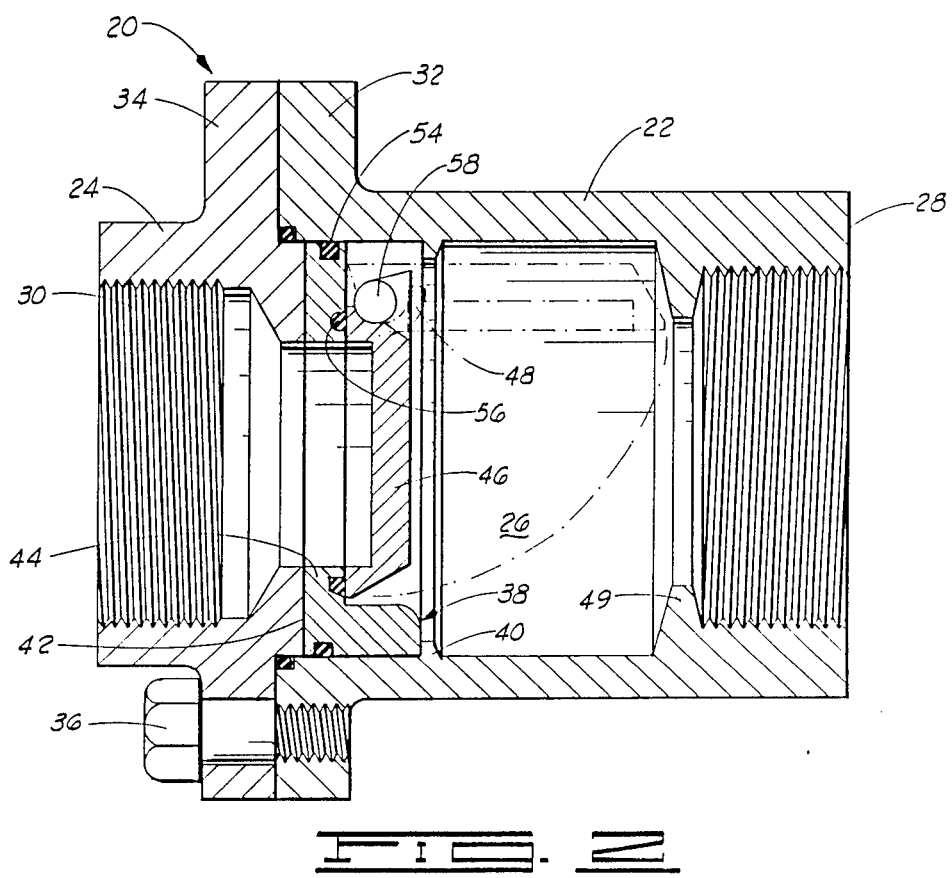
FIG. 2 is a cross sectional view taken along lines 2—2 of FIG. 1.

Referring to the drawings in detail, and particularly FIGS. 1 and 2, reference character 20 generally designates a swing check valve constructed in accordance with this invention. The valve body is constructed in a first part 22 and a second part 24. The first part 22 is of tubular construction having a solid, uninterrupted wall around the valve chamber 26 formed therein. One end 28 of the body part 22 is internally threaded for connection with one end of a section of conduit in which the valve is installed. Similarly, the second body part 24 is of tubular construction and the free end 30 thereof is internally threaded for connection with an adjacent section of the conduit in which the valve is installed. The body parts 22 and 24 have cooperating pipe-type flanges 32 and 34 which are interconnected by suitable bolts 36 when the valve is assembled.

What is called a valve cartridge 38 herein is secured in the valve chamber between a circumferential shoulder 40 in the valve chamber 26 and an extension 42 formed on the second valve body part 24. The cartridge 38 basically comprises a valve seat 44, valve disc 46 and hanger 48 on the valve seat 44 pivotally supporting the valve disc 46. As illustrated in FIG. 2, the valve disc 46 is shown in a closed position in solid lines and in a fully open position in phantom where the disc extends at approximately 90° from the valve seat 44. Thus, the end 30 of the valve body part 24 would be considered the inlet for the valve and the end 28 of the valve body part 22 would be considered the outlet for the valve—the function of the valve being to permit flow from left to right in FIG. 2 but to prevent a reverse flow from right to left. It should also be noted that a circumferential shoulder 49 is formed at the discharge end of the valve chamber 26 of a size to prevent the loss of the disc 46 downstream in the event of a failure of the support for the disc.

The valve seat 44 is shown separately in FIG. 3 for clarity of illustration. It will be seen that the valve seat 44 is annular in configuration with substantially planar end faces, one of which, indicated by reference character 50, is considered the seating face. A cage 51, forming a part of the valve seat 44, extends around more than one-half the periphery of the seating face 50. The inner periphery of the cage 51 provides a guide for the disc 46 that will be discussed further below. The diametrical clearance between the inner periphery of the cage 51 and the outer periphery of the disc 46 is between 1/64" and 3/32" with 1/16" being preferred. The hanger 48 is formed at the free ends of the cage 51 to provide what may be considered elongated bearing areas 52 for the disc hinge pin, as will be discussed below. A suitable seal ring 54 is provided in a complementary groove in the outer periphery of the valve seat portion 44 to sealingly engage the inner periphery of the adjacent portion of the valve chamber 26 of the valve as illustrated in FIG. 2. At this point, it may be noted that the valve seat 44 is sized such as to provide a relatively tight sliding fit thereof in the valve chamber 26. A sealing ring 56 is also provided in a complementary groove in the seating face 50 to be sealingly engaged by the valve disc, as will be described below.

The valve disc 46 is shown separately in FIGS. 4, 5 and 6 where it will be seen that the disc basically comprises a substantially round plate having a hinge pin 58 formed integrally therewith at one edge of the valve disc. As shown most clearly in FIG. 5, the centerline of the hinge pin 58 is parallel with the seatin face 60 of the valve disc. The hinge pin 58 protrudes from the opposite sides of the valve disc to extend into and be supported by the bearing areas 52 of the hanger 48. The clearance between the ends of the hinge pin 58 and the adjacent surface of the valve chamber 26 is preferably in the range of 1/64" to 3/32" to guide the disc 46 and maintain the disc in alignment with the valve seat when the disc is open.

The mass of the valve disc is schematically indicated by the designations $M_1$ and $M_2$ in FIG. 5. As shown, the mass of the disc extending between the seating face 60 and a plane extending through the centerline of the hinge pin 58 parallel with the face 60, designated as $M_1$ in FIG. 5, is less than the remaining mass of the disc illustrated between the plane through the centerline of the hinge pin 58 and the opposite or back side 62 of the disc. With this distribution of the mass of the disc, when the disc is supported solely by the hinge pin 58 resting in the bearing areas 52 to extend generally on a vertical plane, the disc tends to move toward a closing position as illustrated in FIG. 6, such that gravity tends to augment the sealing or closing action of the disc.

As shown most clearly in FIG. 5, the disc 46 is also provided with a protrusion 64 having the end 65 thereof extending away from the valve disc preferably tapered away from the main body of the disc 46 through an angle $\alpha$, such that the extreme outer edge $P_2$ of the protrusion 64 extends beyond the level of the outer surface of the hinge pin 58 and provides a pressure point, as will be described below. In this same terminology, the centerline of the hinge pin 58 may be considered pivot point $P_1$. Similar pressure points may be provided by forming a lobe 66 on the hinge pin 58 as illustrated in FIG. 5A.

As shown in FIG. 7, each bearing area 52 of the hanger 48 terminates in a shoulder 68 spaced from the adjacent face of the valve seat 44 a distance greater than the diameter of the hinge pin 58. Thus, a space 70 is provided for movement of the hinge pin 58 on the bearing areas 52, and hence movement of the disc 46 axially toward and away from the valve seat 44 a limited distance 70. The result being that the disc 46 "floats" into a seating position with respect to the valve seat 44 when the valve is being closed. It should also be noted at this point that the cage 51 accurately guides the disc 46 into seating position to assure that the sealing ring 56 is fully engaged around the entire circumference thereof for effective valve closure. The cage 51 assures that the disc seating face 60 will be parallel with the valve seat seating face 50 when the disc is in its final closed position. Thus, a reasonable amount of misalignment of the hinge pin 58, either through wear or otherwise, will be overcome by the guiding action of the cage 51.

When the valve disc 46 is in a fully open position, extending at substantially 90° to the valve seat 44, as shown in FIG. 8, the end $P_2$ of the valve seat protrusion 64 engages the adjacent face of the valve seat 44 and urges the hinge pin 58 into a very short distance (indicated as 72 on the drawing) from the bearing area shoulder 68. This action of the pressure point $P_2$ engaging the valve seat 44 moves the hinge pin 58 through the distance 74 indicated in FIG. 8. The result is that when the valve is used in a substantially horizontal conduit, the disc 46 will have a greatly reduced tendency to chatter when in an open position during turbulent flow. This arrangement and construction has a further advantage when the valve of this invention is used in a substantially vertically oriented conduit as illustrated in FIG. 9. As shown in this FIG., when the disc 46 is in a fully open position to extend vertically, the pressure point $P_2$ of the protrusion 64 engages the valve seat 44, such that the valve disc 46 is then supported by the pressure point $P_2$, rather than the hinge pin 58. As a result, the entire mass, consisting of $M_1$ plus $M_2$, becomes active in the action of gravity closing the valve 46. Thus, the valve disc 46 will not become "stuck" in a fully open position in a no-flow condition.

As shown in FIGS. 10 and 11, the seal ring 56 in the valve seat 44 is installed in a groove 76 in the seating face 50 of the valve seat. The groove 76 and seal; ring 56 are constructed in such a manner that the seal ring 56 completely fills the groove 76 and protrudes beyond the seating face 50 of the valve seat. For example, one edge portion 78 of the groove 76 may be crimped inwardly to firmly grip the seal ring 56 and hold it in the groove 76. Further, the portion 80 of the valve seat seating face 50 radially outwardly of the groove 76 is axially recessed from the remainder of the seating face 50. Thus, when the valve disc 46 moves into a closed position into engagement with the seating face 50, the elastomeric material of the seal ring 56 is distorted over the adjacent portion of the recessed seating face 80. With this arrangement, the elastomeric material of the seal ring 56 will not be pinched off by closing of the valve disc and a portion 82 of the seal ring is extended into the form of a pressure responsive lip, such that pressure acting between the valve seat 44 and the disc 46 will tend to distort the lip portion 82 into sealing engagement with the adjacent portion of the valve disc and augment the sealing action of the valve.

A modified, screw-type valve 20a is shown in FIG. 12 wherein it will be noted that one end 84 of the body part 22a is internally threaded to receive the externally threaded end 85 of the body part 24a. The valve seat 44 is fitted into a counterbore in the end 84 of the valve chamber 26a, such counterbore forming the shoulder 40 for holding the cartridge 38 in its operating position in the valve. The valve disc 46 may or may not be provided with a projection similar to the projection 64 previously described. In this embodiment, an internal shoulder 86 is provided in the valve chamber 26a to engage the valve disc 46 when the valve disc is fully open and provides a stop to limit the opening movement of such disc. The internal diameter of the shoulder 86 will be substantially equal to the inner diameter of the valve seat 44 to prevent the loss of the valve disc in the event of a failure in the supporting hinge structure. It will be noted that in this modified valve, the cartridge 36 is inserted through one end of the valve body part 22a and the walls of the valve body part 22a are interrupted, solid walls. Also, the body parts 22a and 24a are provided with internally threaded ends for connection with adjacent sections of a conduit in which the valve may be employed.

Figure 13:
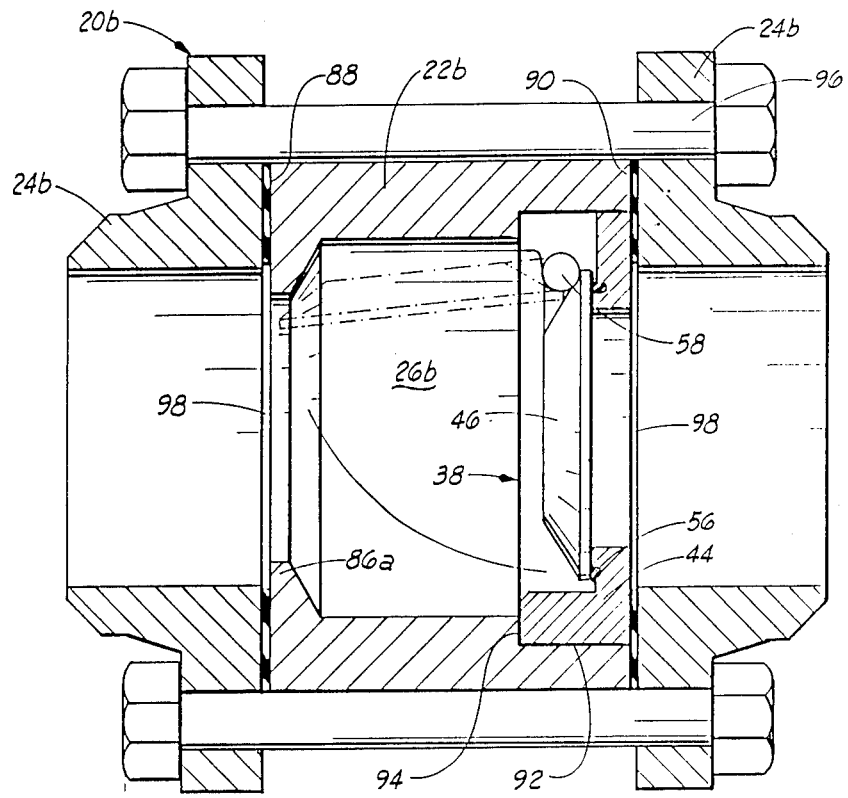
FIG. 13 is a cross sectional view through another modification of valve.

A between flange valve constructed pursuant to this invention is illustrated in FIG. 13 and is designated by the reference character 20b. This valve comprises a modified first valve body part 22b which is of tubular construction having planar ends 88 and 90 and is of solid wall construction to form the valve chamber 26b. The valve cartridge 38 is slidingly fitted in a counterbore 92 at the end 90 of the valve body part 22b and engages a shoulder 94 formed at the end of the counterbore 92. The valve chamber 26b is provided with an internal shoulder 86a adjacent the end 88 of the valve body part 22b which forms a stop for the valve disc 46 during the opening movement of the valve disc. Standard pipe flanges 24b are provided at the opposite ends of the valve body part 22b and are held in assembled relation against the ends of the valve body part 22b by suitable bolts 96. Suitable gaskets 98 are provided between the pipe flanges and the opposite ends of the valve body part 22b to prevent the leakage of fluid being controlled by the valve. The valve flange 24b adjacent the end 90 of the valve body part 22b retains the cartridge 38 in the desired position in the valve chamber 26b.

Figure 14:
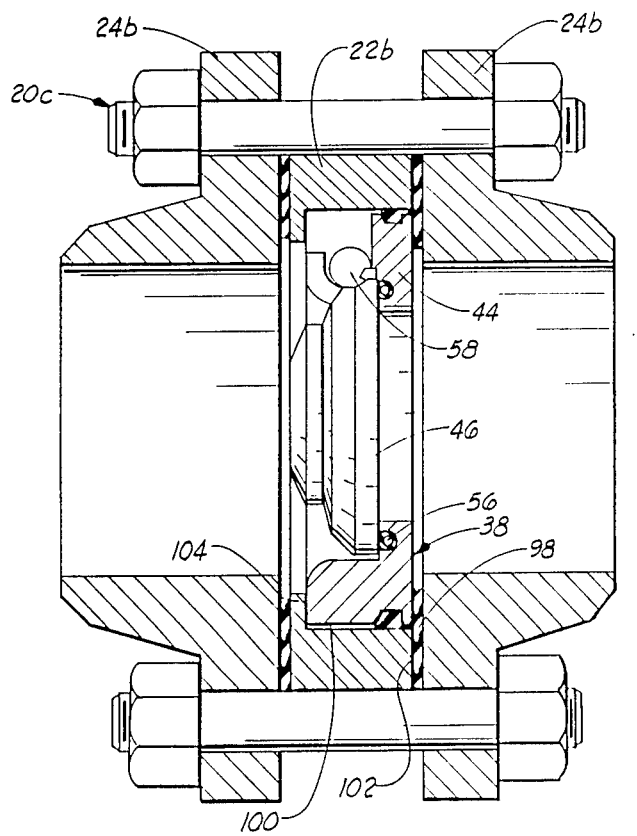
FIG. 14 is a cross sectional view of another modification of valve pursuant to this invention.

A wafer-type construction pursuant to this invention is illustrated in FIG. 14 wherein the valve is designated by reference character 20c. In this construction, the valve body part 22b is of tubular construction and of limited length to fit between standard pipe flanges 24b in the usual fashion of a wafer-type valve. A counterbore 100 is formed in one end 102 of the valve body part 22b to receive the valve cartridge 38. The valve cartridge 38 is held against the shoulder 104 formed by the counterbore 100 by one of the pipe flanges 24b. Suitable gaskets 98 are provided between the opposite ends of the valve body part 22b and the pipe flanges to maintain the seal. In this construction, the valve disc 46 swings into one of the pipe flanges 24b when the valve is in an open position.

A modified valve seat is illustrated in FIGS. 15 and 16 and designated by the reference character 44a. This modified valve seat is constructed in the same manner as the valve seat 44 previously described with certain exceptions. First, in the modified valve seat 44a, the seating face 50 of the valve seat is planar and is not provided with a seal ring. Second, a slot 106 is provided in the cage portion 51a at a location diametrically opposed to the opening in the cage between the portions forming the hanger 48. When the valve seat 44a is installed in a valve where the slot 106 is at the lower end of the valve chamber, the slot 106 provides a passageway for dirt or other debris that may tend to accumulate in the valve seat and interfere with operation of the valve. Third, projections 64a are provided on the back side of the seat 44a above and between the hanger 48 for a purpose to be described.

A modified valve disc 46a is illustrated in FIGS. 17 and 18 and is constructed to be used with the modified valve seat illustrated in FIGS. 15 and 16 and previously described. The modified valve disc 46a is provided with an elastomeric seal ring 108 in a complementary groove in the seating face 60a of the disc. The seal ring 108 is sized to engage the seating face 50 of the valve seat 44a when the disc 46a is used in conjunction with the modified seat 44a. Preferably, the seal ring 108 is confined in a groove in the same manner as the seal ring 56 previously described and illustrated in enlarged form in FIGS. 10 and 11. Also, the diametrical clearance between the inner periphery of the cage 51a and the outer periphery of the modified disc 46a is preferably the same as previously described in connection with the disc 46 and cage 51. Finally, the extensions 110 on the disc 46a from which the hinge pin sections 48 extend are provided with flat ends 112 rather than projections as in the previously described disc 46. The flat ends 112 and projections 64a are positioned to come into contact as the disc 46a is being opened and approaches an angle of about 90° from the seat 44a. As a result, the hinge pin 58 is moved in the hanger 48 away from the valve seat 44a as the disc 46a reaches the 90° position.

Changes may be made in the nature, composition, operation and arrangement of the various elements, steps and procedures described herein without departing from the spirit and scope of the invention as defined in the following claims.

What is claimed is:

1. A swing check valve for controlling the flow of fluid through a conduit, comprising:

valve body means having a valve chamber therein communicating with inlet and outlet passageways therein for installation in the conduit with the inlet and outlet passageways communicating with adjacent sections of the conduit;

an annular valve seat secured in the valve chamber;

a valve disc in the valve chamber having a seating face size to mate with the valve seat and having a hinge pin thereon, the longitudinal axis of the hinge pin extending parallel with said seating face;

hanger means in the valve chamber for pivotally supporting the hinge pin of the disc where the hinge pin can move toward and away from the valve seat a limited distance and the disc can move a limited extent toward and away from the valve seat along the longitudinal axis of the valve seat with the seating face of the disc parallel with the valve seat; and wherein the valve disc has a shoulder thereon positioned to engage the valve seat when the valve disc extends at about 90° from the valve seat and urge said hinge pin in said hanger means away from the valve seat.

2. A valve as defined in claim 1 characterized further to include an annular groove in the outer periphery of said seat and an elastomeric seal ring in said groove sealingly engaging the walls of the valve chamber to prevent the leakage of fluid around said seat.

3. A swing check valve for controlling the flow of fluid through a conduit, comprising:

valve body means having a valve chamber therein communicating with inlet and outlet passageways therein for installation in the conduit with the inlet and outlet passageways communicating with adjacent sections of the conduit;

an annular valve seat secured in the valve chamber;

a valve disc in the valve chamber having a seating face sized to mate with the valve seat and having a hinge pin thereon, the longitudinal axis of the hinge pin extending parallel with said seating face;

hanger means in the valve chamber for pivotally supporting the hinge pin of the disc where the hinge pin can move toward and away from the valve seat a limited distance and the disc can move a limited extend toward and away from the valve seat along the longitudinal axis of the valve seat with the seating face of the disc parallel with the valve seat; and a generally annular cage secured in the valve chamber surrounding more than one-half the periphery of the disc when the disc is seated on the valve seat, the inner periphery of the cage being sized to guide the disc onto the valve seat; and wherein:

the valve disc has a shoulder thereon positioned to engage the valve seat when the valve disc extends at about 90° from the valve seat and urge said hinge pin in said hanger means away from the valve seat.

4. A swing check valve for controlling the flow of fluid through a conduit, comprising:

valve body means having a valve chamber therein communicating with inlet and outlet passageways therein for installation in the conduit with the inlet and outlet passageways communicating with adjacent sections of the conduit; and a removeable valve cartridge in the valve chamber, said cartridge comprising:

a member forming an annular valve seat extending transversely across the valve chamber, and means forming a pair of hinge pin bearing areas extending in a plane at a right angle to the plane of the valve seat; and a disc having a seating area sized to engage the valve seat and having a hinge pin formed integrally therewith pivotally supported on said bearing areas, having the longitudinal centerline thereof extending in a plane parallel with the seating area of the disc; and wherein:

the valve disc has a shoulder thereon positioned to engage the valve seat when the valve disc extends at about 90° from the valve seat and urge said hinge pin on said bearing areas away from the valve seat.

5. A swing check valve for controlling the flow of fluid through a conduit, comprising:

valve body means having a valve chamber therein communicating with inlet and outlet passageways therein for installation in the conduit with the inlet and outlet passageways communicating with adjacent sections of the conduit; and a removable valve cartridge in the valve chamber, said cartridge comprising:

a member forming an annular valve seat extending transversely across the valve chamber, and a cage means extending around a portion of the periphery of the valve seat forming a pair of hinge pin bearing areas extending in a plane at a right angle to the plane of the valve seat; and a disc having a seating area sized to engage the valve seat and having a hinge pin formed integrally therewith pivotally supported on said bearing areas having the longitudinal centerline thereof extending in a plane parallel with the seating area of the disc, and said hinge pin having a diameter less than the length of each bearing area, whereby the hinge pin can move a limited distance toward and away from the valve seat and the disc can move a limited distance toward and away from the valve seat along the longitudinal axis of the valve seat with the seating area of the disc parallel with the valve seat; wherein:

the valve disc has a shoulder thereon positioned to engage the valve seat when the valve disc extends at about 90° from the valve seat and urge said hinge pin on said bearing areas away from the valve seat.

6. A swing check valve for controlling the flow of fluid through a conduit, comprising:

valve body means having a valve chamber therein communicating with inlet and outlet passageways therein for installation in the conduit with the inlet and outlet passageways communicating with adjacent sections of a conduit;

an annular valve seat secured in the valve chamber having a seating face thereon extending transversely across the valve chamber;

a valve disc in the valve chamber having a seating face sized to mate with the seating face of the valve seat and having a hinge pin thereon, the longitudinal axis of the hinge pin extending parallel with said seating face;

hanger means in the valve chamber for pivotally supporting the hinge pin of the disc; and wherein:

one of said seating faces having an annular groove therein and an axially recessed portion extending radially from the outer edge of said groove;

and characterized further to include an elastomeric seal ring in said groove sized to completely fill said groove and, in an uncompressed state, extend axially beyond the seating face containing the groove.

7. A swing check valve as defined in claim 6 wherein the seating face having said annular groove therein is the seating face on the valve seat.

8. A swing check valve for controlling the flow of fluid through a conduit, comprising:

valve body means having a valve chamber therein communicating with inlet and outlet passageways therein for installation in the conduit wiht the inlet and outlet passageways communicating with adjacent sections of the conduit;

an annular valve seat secured in the valve chamber;

a valve disc in the valve chamber having a seating face sized to mate with the valve seat and having a hinge pin thereon, the longitudinal axis of the hinge pin extending parallel with said seating face;

hanger means in the valve chamber for pivotally supporting the hinge pin of the disc where the hinge pin can move toward and away from the valve seat a limited distance and the disc can move a limited extent toward and away from the valve seat along the longitudinal axis of the valve seat with the seating face of the disc parallel with the valve seat; and wherein:

the valve seat has a seating face thereon extending transversely across the valve chamber, the seating face on the valve seat having an annular groove therein and an axially recessed portion extending radially from the outer edge of said groove;

and characterized further to include an elastomeric seal ring in said groove sized to completely fill said groove and, in an uncompressed state, extend axially beyond the seating face of the valve seat for distortion by the valve disc against the axially recessed portion of the seating face.

9. A swing check valve for controlling the flow of fluid through a conduit, comprising:

valve body means having a valve chamber therein communicating with inlet and outlet passageways therein for installation in the conduit with the inlet and outlet passageways communicating with adjacent sections of the conduit;

an annular valve seat secured in the valve chamber;

a valve disc in the valve chamber having a seating face sized to mate with the valve seat and having a hinge pin thereon, the longitudinal axis of the hinge pin extending parallel with said seating face;

hanger means in the valve chamber for pivotally supporting the hinge pin of the disc where the hinge pin can move toward and away from the valve seat a limited distance and the disc can move a limited extent toward and away from the valve seat along the longitudinal axis of the valve seat with the seating face of the disc parallel with the valve seat; and a generally annular cage secured in the valve chamber surrounding more than one-half the periphery of the disc when the disc is seated on the valve seat, the inner periphery of the cage being sized to guide the disc onto the valve seat; and wherein:

the valve seat has a seating face thereon extending transversely across the valve chamber, the seating face on the valve seat having an annular groove therein and an axially recessed portion extending radially from the outer edge of said groove;

and characterized further to include an elastomeric seal ring in said groove sized to completely fill said groove and, in an uncompressed state, extend axially beyond the seating face of the valve seat for distortion by the valve disc against the axially recessed portion of the seating face.

10. A swing check valve for controlling the flow of fluid through a conduit, comprising:

valve body means having a valve chamber therein communicating with inlet and outlet passageways therein for installation in the conduit with the inlet and outlet passageways communicating with adjacent sections of the conduit; and a removable valve cartridge in the valve chamber, said valve cartridge comprising:

a member forming an annular valve seat extending transversely across the valve chamber and means for forming a pair of hinge pin bearing areas extending in a plane at a right angle to the plane of the valve seat; and a disc having a seating area sized to engage the valve seat and having a hinge pin formed integrally therewith pivotally supported on said bearing areas having the longitudinal centerline thereof extending in a plane parallel with the seating area of the disc; and wherein:

the valve seat has a seating face thereon extending transversely across the valve chamber, the seating face on the valve seat having an annular groove therein and an axially recessed portion extending radially from the outer edge of said groove; and characterized further to include an elastomeric seal ring in said groove sized to completely fill said groove and, in an uncompressed state, extend axially beyond the seating face of the valve seat for distortion by the valve disc against the axially recessed portion of the seating face.

11. A swing check valve for controlling the flow of fluid through a conduit, comprising:

valve body means having a valve chamber therein communicating with the inlet and outlet passageways therein for installation in the conduit with the inlet and outlet passageways communicating with adjacent sections of the conduit; and a removable valve cartridge in the valve chamber, said cartridge comprising:

a substantially round disc having an annular seating face on one side thereof and a hinge pin thereon positioned at least in part radially outward of the disc, the axis of the hinge pin being parallel with the seating face of the disc; and a member forming an annular valve seat extending transversely across the valve chamber having an annular seating face on one side thereof, and an annular cage surrounding a portion of the valve seat seating face having a pair of free ends, each of said free ends forming a bearing area for the hinge pin extending parallel with the longitudinal axis of the valve seat and a shoulder spaced from the valve seat seating face a distance greater than the diameter of the hinge pin, whereby the hinge pin can move a limited distance toward and away from the valve seat seating face between said shoulders and the valve seat seating face, and the valve disc can move a limited distance toward and away from the valve seat seating face along the longitudinal axis of the valve seat with the seating face of the disc parallel with the seating face of the valve seat, the cage guiding the disc in said limited distance movement.

12. A swing check valve as defined in claim 11 wherein the valve body means comprises:

a first part containing the valve chamber having (a) a solid, uninterrupted wall surrounding the valve chamber, (b) an inner diameter at one end thereof of a size to slidingly receive the annular seat portion of the valve cartridge, and (c) a circumferential shoulder therein to limit the movement of the valve seat portion into the valve chamber;

a second part of tubular construction secured to said one end of the first part and sized to hold the valve seat portion against said shoulder in the valve chamber; and means for sealing the outer periphery of the valve seat portion to the wall of the valve chamber.

13. A swing check valve as defined in claim 12 wherein said first part of said valve body means has a flange at said one end; and said second part of said valve body means has a flange thereon mating with the flange on the first part.

14. A swing check valve as defined in claim 12 wherein said first part is internally threaded at said one end and said second part has a threaded extension thereon extending into and engaging the threaded first end of said first part.

15. A swing check valve as defined in claim 11 characterized further to include a projection in the valve chamber arranged to engage the valve disc as the valve disc approaches a position 90° from the valve seat to move the hinge pin in the hanger means away from the valve seat.

16. A swing check valve as defined in claim 15 wherein the projection is on the valve seat.

17. A valve as defined in claim 11 wherein the valve chamber is substantially circular in cross section and said member is sized and shaped to slidingly fit in the valve chamber and characterized further to include a seal ring secured in a mating groove in the outer periphery of said member sealingly engaging the walls of the valve chamber.

18. A valve as defined in claim 11 wherein one of said seating faces has an annular groove therein and an axially recessed portion extending radially from the outer edge of said groove; and characterized further to include an elastomeric seal ring in said groove sized to completely fill said groove and, in an uncompressed state, extend axially beyond the respective seating face for distortion against the axially recessed portion when the valve is closed.

19. A valve as defined in claim 18 wherein the seal ring is positioned in a groove formed in the seating face of the valve seat.

20. A valve as defined in claim 11 wherein the cage extends around more than one-half the periphery of the valve seat seating area, and characterized further to include means in the cage forming a slot in the cage opposite the hinge poin.

21. A valve as defined in claim 11 characterized further to include an elastomeric seal ring in a mating groove in one of said seating faces positioned to be engaged by the other seating face when the valve is closed.

22. A check valve as defined in claim 21 wherein the elastomeric seal ring is secured in a mating groove in the seating face of the valve seat.

23. A valve as defined in claim 21 wherein the elastomeric seal ring is secured in a mating groove in the seating face of the disc.

24. A valve as defined in claim 11 wherein both ends of the valve body means are planar, a counterbore formed in one end of the valve body means formign a circumferential shoulder facing said one end, said member forming a valve seat being shaped and sized to slidingly fit in said counterbore against said annular shoulder, and characterized further to include:

a pair of pipe flanges secured adjacent the opposite ends of the valve body means, and gaskets between each pipe flange and the respective end of the valve body means, holding the valve cartridge in operating position in the valve body means.

* * * * *